March 25, 1969　　　W. A. EMERSON　　　3,435,172
INDUCTION HEATING SYSTEM
Filed March 2, 1967
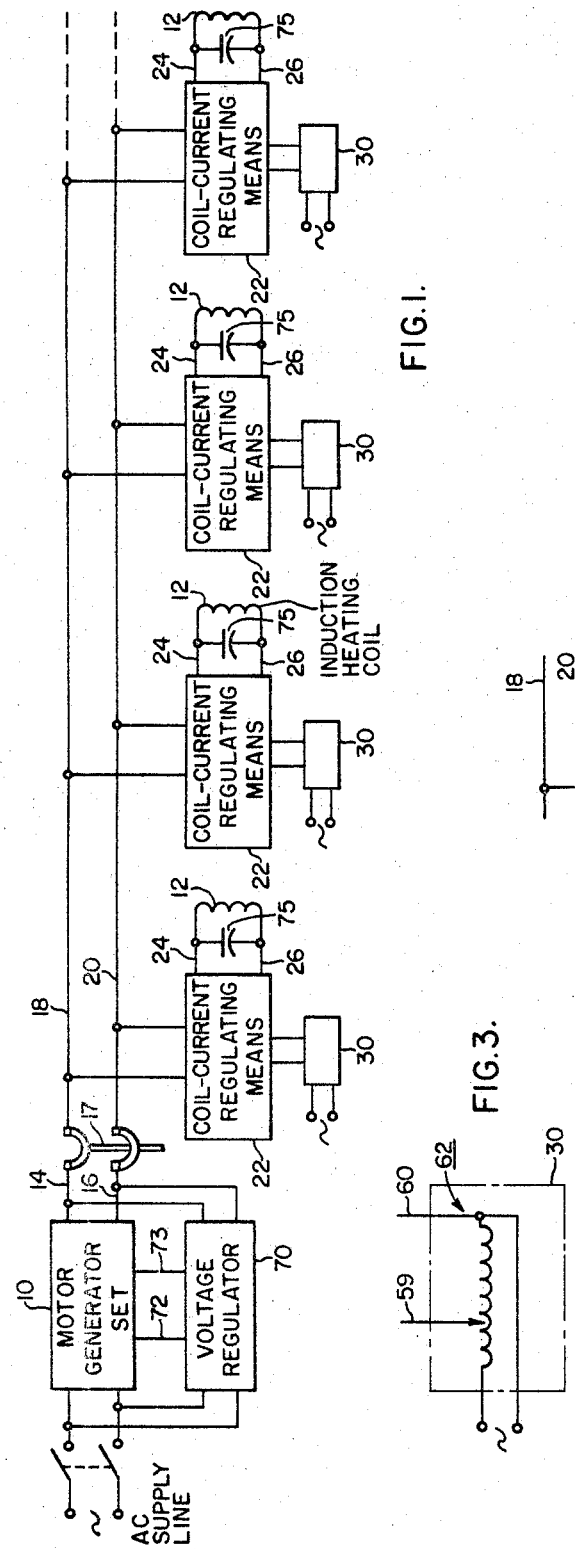
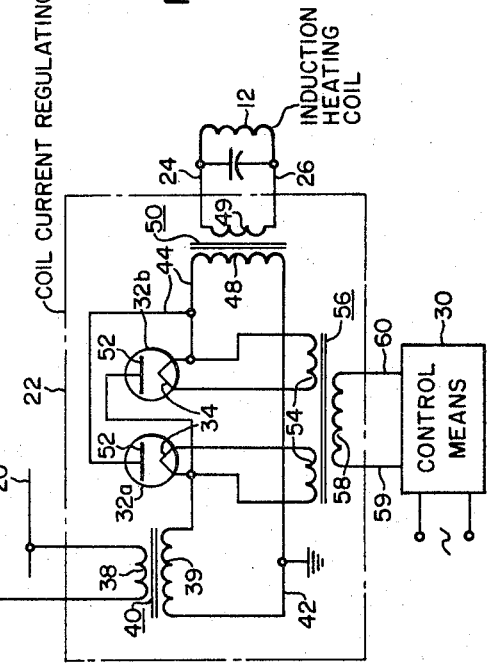
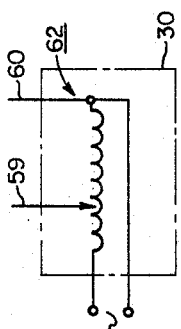
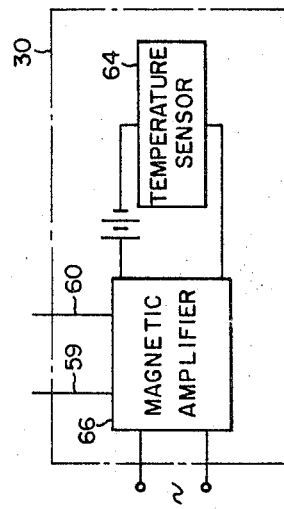
INVENTOR
William A. Emerson
BY
AGENT United States Patent Office 3,435,172
Patented Mar. 25, 1969

3,435,172
INDUCTION HEATING SYSTEM
William A. Emerson, Catonsville, Md., assignor to Westinghouse Electric Corporation, Pittsburgh, Pa., a corporation of Pennsylvania
Filed Mar. 2, 1967, Ser. No. 620,071
Int. Cl. H05b 5/00
U.S. Cl. 219—10.75      2 Claims

ABSTRACT OF THE DISCLOSURE

An induction heating system in which a number of induction heating coils are operated from a single motor generator set while providing for individual regulation of power to the several coils. Current to each coil is regulated by a respective group of high-vacuum pure-tungsten diodes according to filament current supplied to such diodes. Voltage step-up transformers couple the diode groups to the common motor-generator set, and voltage step-down transformers couple such diode groups to the heating coils, thereby rendering compatible the operating conditions of the generator, diodes, and heating coils.

BACKGROUND OF THE INVENTION

Field of the invention

An induction heating system having a plurality of simultaneously-operable induction heating coils at a common locale.

DESCRIPTION OF THE PRIOR ART

Heretofore, where a number of induction heating coils, operable at the same motor-generator frequency, were to operate at the same general location, it was considered necessary to provide a separate motor-generator set for each heating coil, unless the heating coils could be operated selectively, or could be operated simultaneously without independent power regulation. This was so because of the lack of a suitable system wherein independent control of power to the several heating coils could result. The common practice has been to regulate the power output from a motor-generator set by controlling its field current, and this results in the simultaneous influencing of available power to all of any several induction heating coils that may be connected across the output of such motor-generator set.

SUMMARY

The present invention overcomes the above limitations of previous single-motor-generator, multi-induction-heating-coil systems by inclusion of respective individual means for controlling supply of energizing current to the heating coils, each of which control means is of a type particularly suited for regulation of power at motor-generator-set frequencies, and more particularly to frequencies at or near ten kilohertz, and which control means employ, as aforementioned, pure-tungsten high-vacuum diodes which enable power regulation by variation in heating current to their filaments, and step-up and step-down transformers to bring the operating conditions of the motor-generator-set, the diodes, and the heating coils into compatibility.

BRIEF DESCRIPTION OF THE DRAWING

FIGURE 1 is a block diagram of the induction heating system of the present invention;

FIG. 2 is a circuit diagram showing details of the system of FIG. 1;

FIG. 3 is a diagram of one means of control which may be embodied in the system of FIGS. 1 and 2; and FIG. 4 is a diagam of another means of control which may be embodied in the system of FIGS. 1 and 2.

DESCRIPTION OF THE PREFERRED EMBODIMENT

Referring to FIGS. 1 and 2, the induction heating system of the present invention comprises a single motor-generator set 10, a plurality of induction heating coils 12, energizable simultaneously or separately from the motor-generator set 10 via output leads 14 and 16, the usual contactor means 17, power supply leads 18 and 20 and branches thereof, a plurality of coil-current regulating means 22, and respective supply leads 24 and 26 connected across such heating coils. Each of the coil-current regulating means 22 has an individual control means 30.

Referring to FIG. 2, in accord with the invention, each coil-current regulating means 30 comprises a pair of high-vacuum pure-tungsten filament diodes 32a and 32b, Westinghouse WL 23178, for example, for operation at their saturation voltage whereby their output will vary according to the temperature of their filaments 34 to regulate high frequency energizing current to the respective induction heating coil. The two diodes are oppositely poled and A.C. coupled to the output from the motor-generator set 10 via the power supply leads 18 and 20, the primary and secondary windings 38 and 39 of a voltage step-up transformer 40, tube circuit leads 42, 44 and 46, secondary and primary windings 48 and 49 of a voltage step-down transformer 50, and the heating coil leads 24 and 26; the lead 42 being connected between one end of the secondary winding 39 and one end of the primary winding 48, lead 44 connecting the other end of winding 48 to the anode 52 of the one diode 32a and to the filament or cathode 34 of the other diode 32b, and lead 46 connecting the other end of winding 39 to the filament or cathode 34 of diode 32a and to the anode 52 of diode 32b.

The heating circuits for the cathodes or filaments 34 of the diodes 32a, 32b, include respective secondary windings 54 of a filament transformer 56, having a primary winding 58 and leads 59 and 60 via which the current is regulated by the control means 30 to vary the current to filament 34, hence vary their temperature, hence vary the current through the diodes, hence vary the energizing current to the respective induction heating coil 12.

The control means 30 may be manually-operable in the form of a simple adjustable transformer 62, as in FIG. 3, or may be automatically operable to include such as a temperature sensing means 64, and a magnetic amplifier 66.

The present invention is particularly advantageous at a motor-generator frequency of nominally ten kilohertz, where the transformers 40 and 50 are relatively small and inexpensive. In one installation, satisfactory results were obtained with a motor-generator set 10 having an output of 220 volts at ten kilohertz, Westinghouse WL 23178 diodes 32a and 32b and transformers 40 and 50 of 1:25 and 25:1, respectively, in a number of regulating means 22 feeding respective induction heating coils 12.

In use of the present invention, the usual voltage regulator 70 may be employed, with field coil energizing control leads 72, 73, to automatically regulate motor-generator set output for maintaining the voltage in supply leads 18 and 20 constant in the presence of varying loads imposed by adjustments of the several regulating means 22.

Capacitors 75 are employed for tuning the inductive load of the coils 12.

I claim as my invention:
1. An induction heating system comprising,
 a high frequency motor-generator set (10) having an output (18, 20);
 a plurality of induction heating coils (12);

a plurality of coil-current regulating means (22) connected in parallel across said output and in series with respective ones of said induction coils (12), each of said coil-current regulating means including,
- a voltage step-up transformer (40) having a primary winding (38) connected across said output (18, 20) and a secondary winding (39),
- a voltage step-down transformer (50) having a secondary winding (49) connected across a respective induction heating coil (12),
- a pair of high-vacuum diodes having pure-tungsten filaments (34),
- conductor means (42, 44, 46) connecting said pair of diodes to pass high frequency current from the secondary winding (39) of said voltage step-up transformer through the primary winding (48) of said voltage step-down transformer; and a plurality of control means (30) for adjustably supplying heating current to the pure-tungsten filaments of the diodes (32a, 32b) in the regulating means (22) respectively.

2. The induction heating system of claim 1, wherein:
the output of the motor-generator set (10) is substantially at a frequency of ten kilohertz at nominally four hundred volts,
and the step-up and step-down transformers have ratios of about 1:25 and 25:1, respectively.

References Cited
UNITED STATES PATENTS

| | | | |
|---|---|---|---|
| 2,856,498 | 10/1958 | Jones | 219—483 |
| 3,247,361 | 4/1966 | Woodley | 219—483 |

RICHARD M. WOOD, *Primary Examiner.*

L. H. BENDER, *Assistant Examiner.*

U.S. Cl. X.R.

219—483, 10.77; 307—34